United States Patent
Binder

(10) Patent No.: US 9,933,448 B1
(45) Date of Patent: Apr. 3, 2018

(54) STRAY-FIELD ROBUST, TWIST-INSENSITIVE MAGNETIC SPEED SENSORS

(71) Applicant: Infineon Technologies AG, Neubiberg (DE)

(72) Inventor: Gernot Binder, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/403,790

(22) Filed: Jan. 11, 2017

(51) Int. Cl.
 *G01D 5/248* (2006.01)
 *G01P 3/487* (2006.01)

(52) U.S. Cl.
 CPC ........... *G01P 3/487* (2013.01); *G01D 5/248* (2013.01)

(58) Field of Classification Search
 CPC ......... G01D 5/248; G01D 5/145; H02P 25/22
 See application file for complete search history.

(56) References Cited

U.S. PATENT DOCUMENTS

| | | | | |
|---|---|---|---|---|
| 2008/0048651 | A1* | 2/2008 | Matsumoto | G01D 5/145 324/207.2 |
| 2010/0013463 | A1* | 1/2010 | Ozaki | G01D 5/245 324/207.2 |
| 2010/0102801 | A1* | 4/2010 | Takahashi | G01D 5/145 324/207.25 |

* cited by examiner

*Primary Examiner* — Jermele M Hollington
*Assistant Examiner* — Alvaro Fortich
(74) *Attorney, Agent, or Firm* — Volpe and Koenig, P.C.

(57) ABSTRACT

Magnetic sensor modules, systems and methods are provided, configured to detect a rotation of an object. A magnetic sensor module includes an axially polarized back bias magnet that generates a radially symmetric bias magnetic field about a center axis of the axially polarized back bias magnet in a sensor plane, and a magnetic sensor including a plurality of sensor elements arranged in the sensor plane of the magnetic sensor and are configured to generate measurement values in response to sensing the radially symmetric bias magnetic field. The plurality of sensor elements are arranged on a circumference of a circle at equidistant angles about the center axis of the axially polarized back bias magnet. The plurality of sensor elements are grouped into a plurality of pairs such that each pair has a sensitivity axis sensitive to a different in-plane magnetic field component of the radially symmetric bias magnetic field.

24 Claims, 14 Drawing Sheets

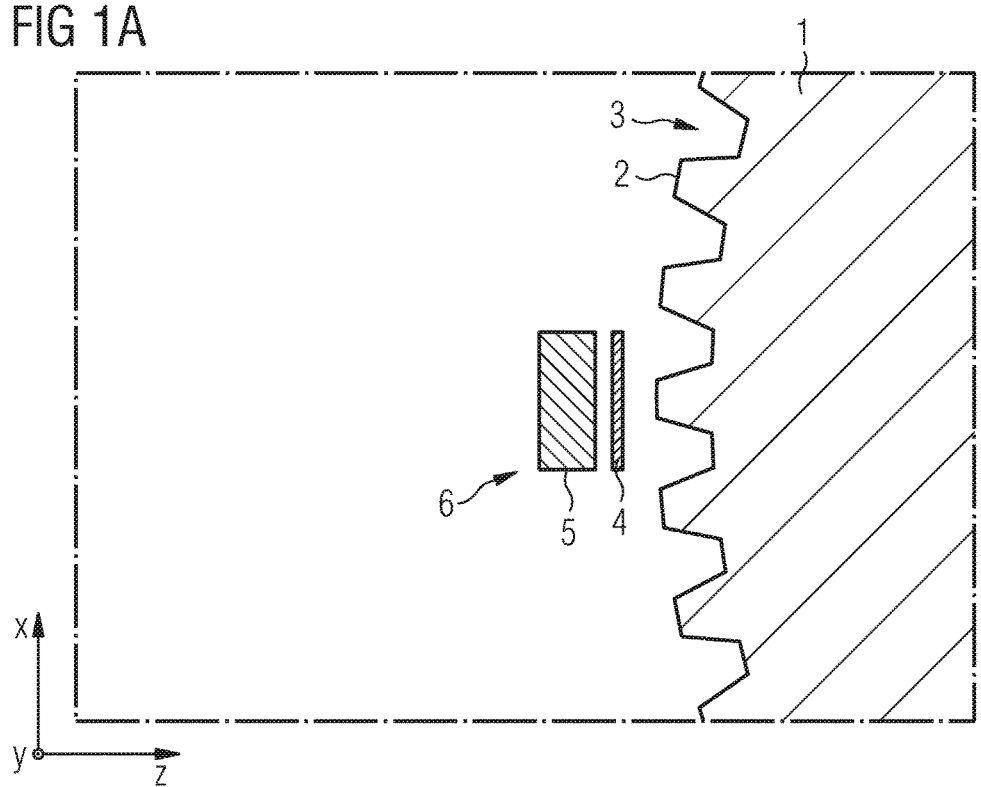
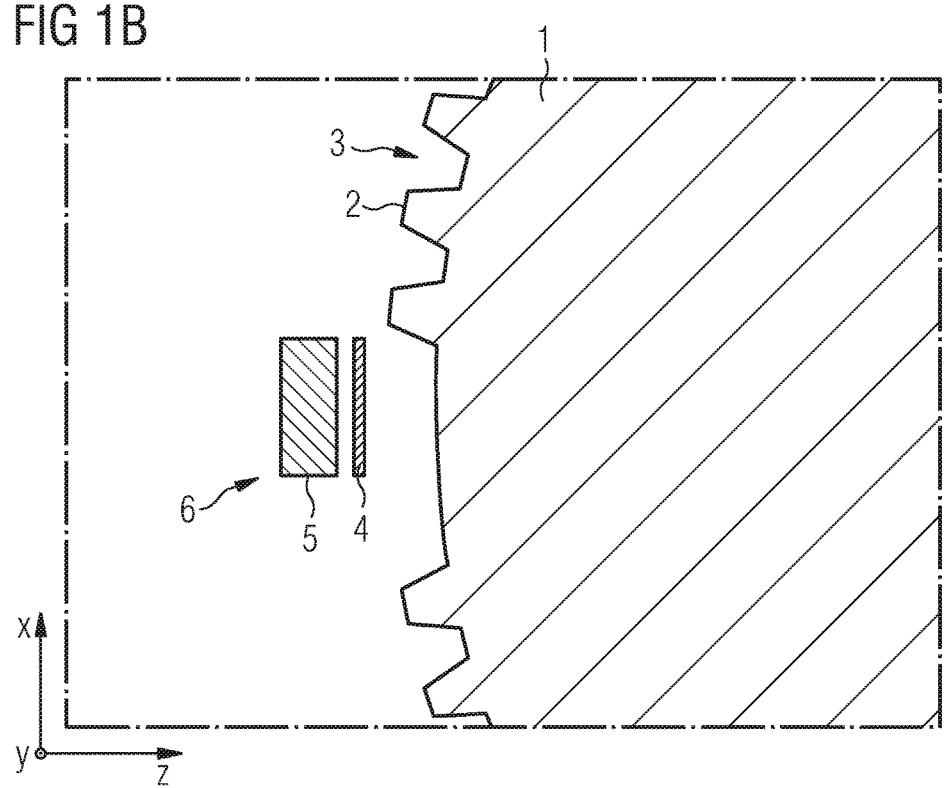

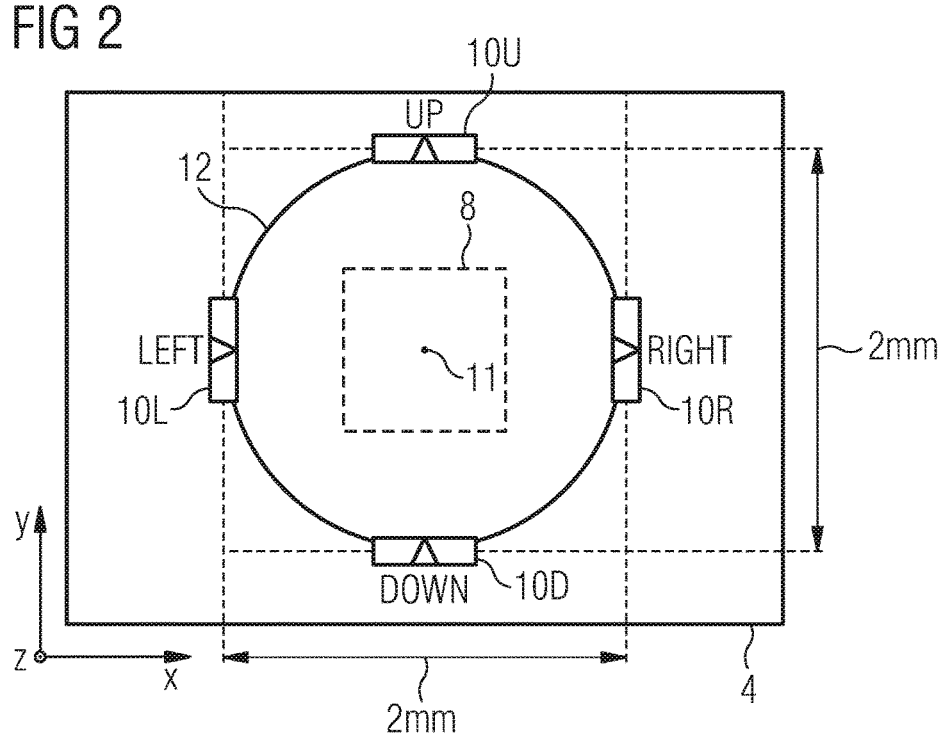
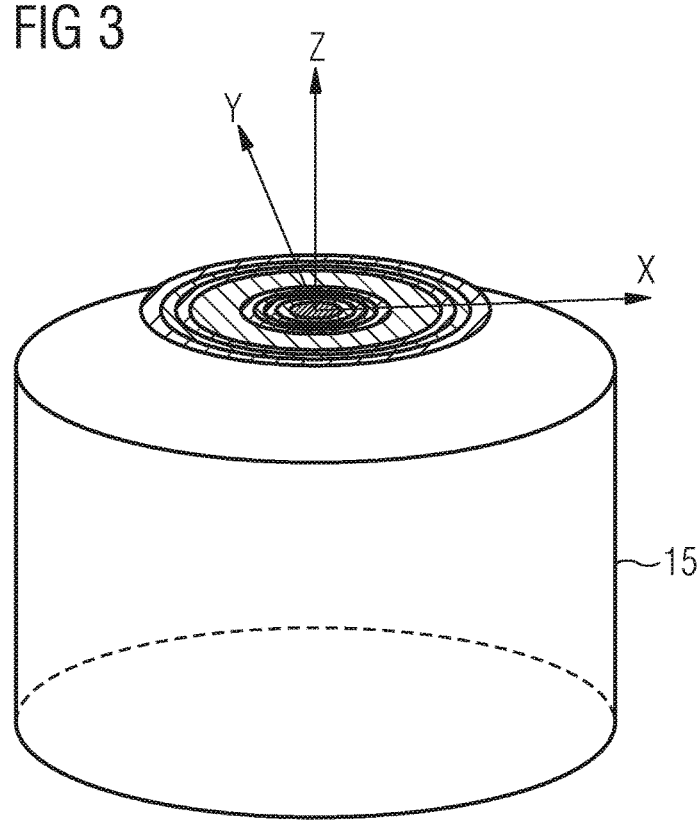

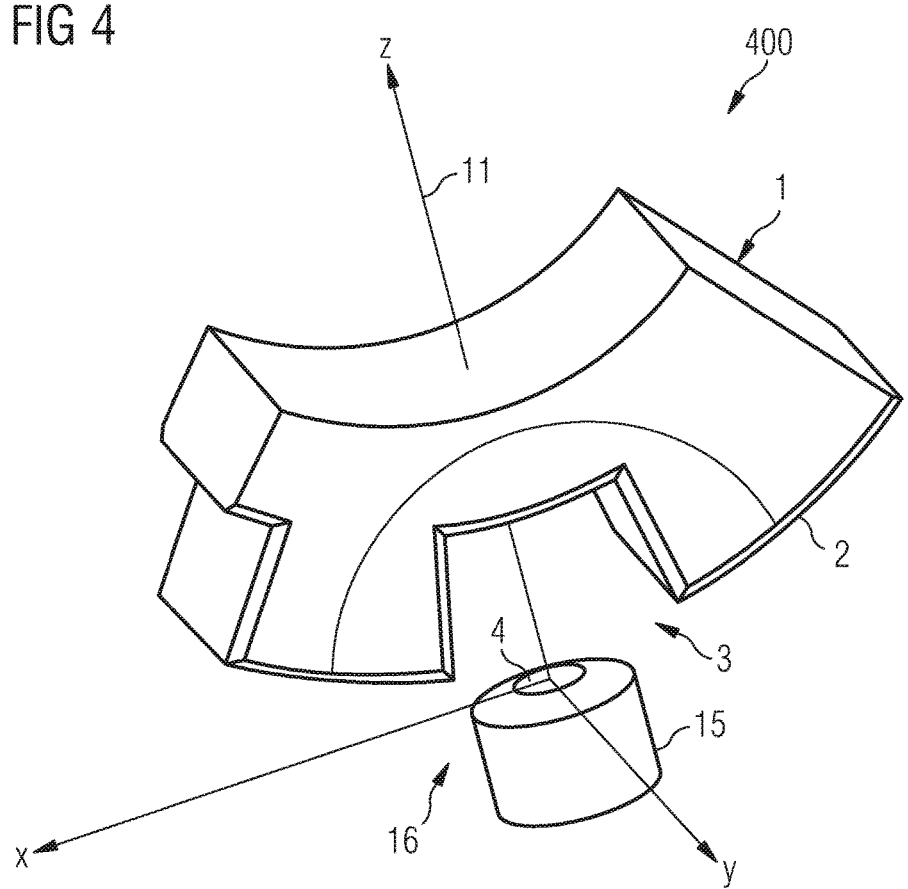

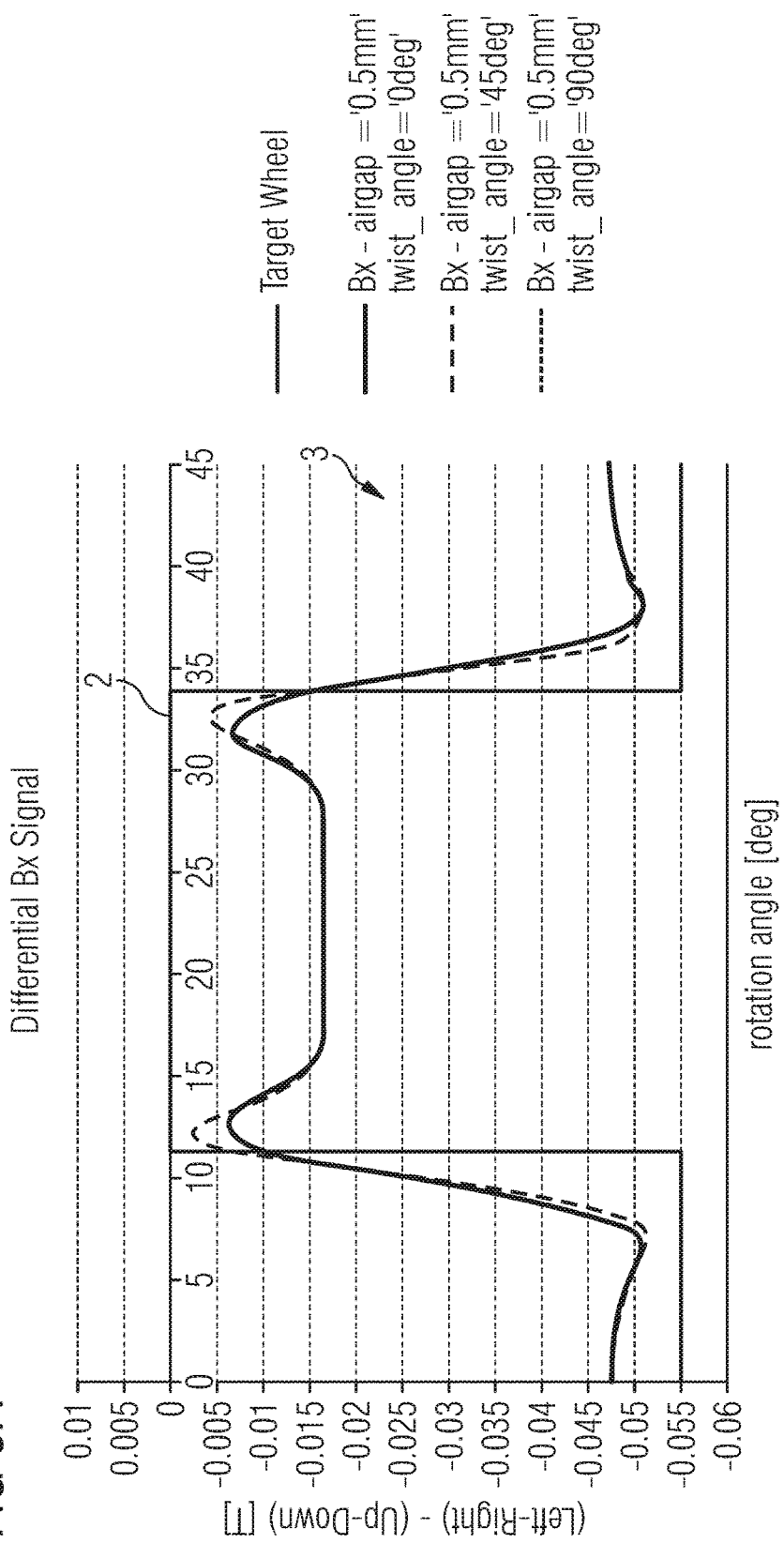

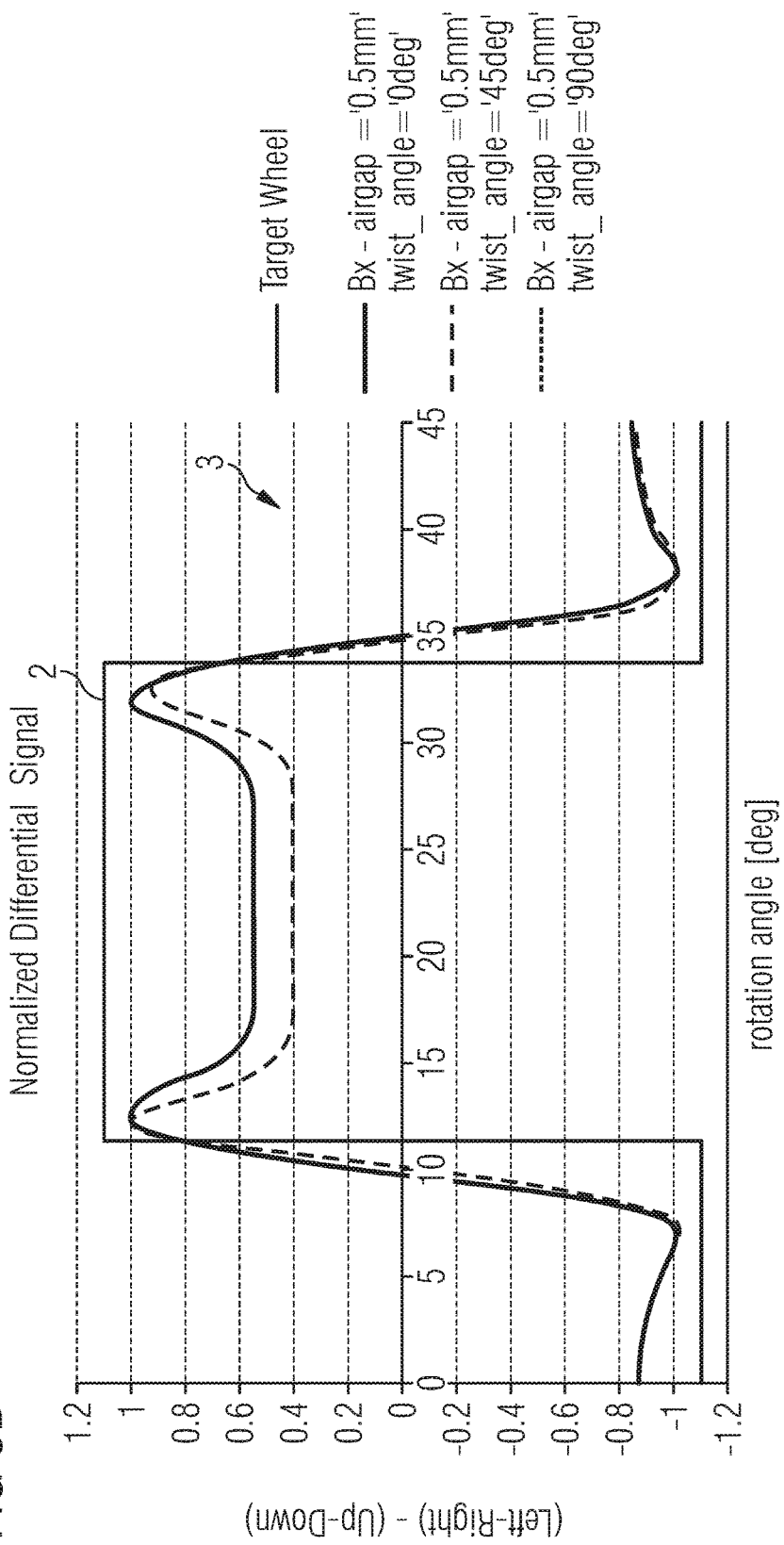

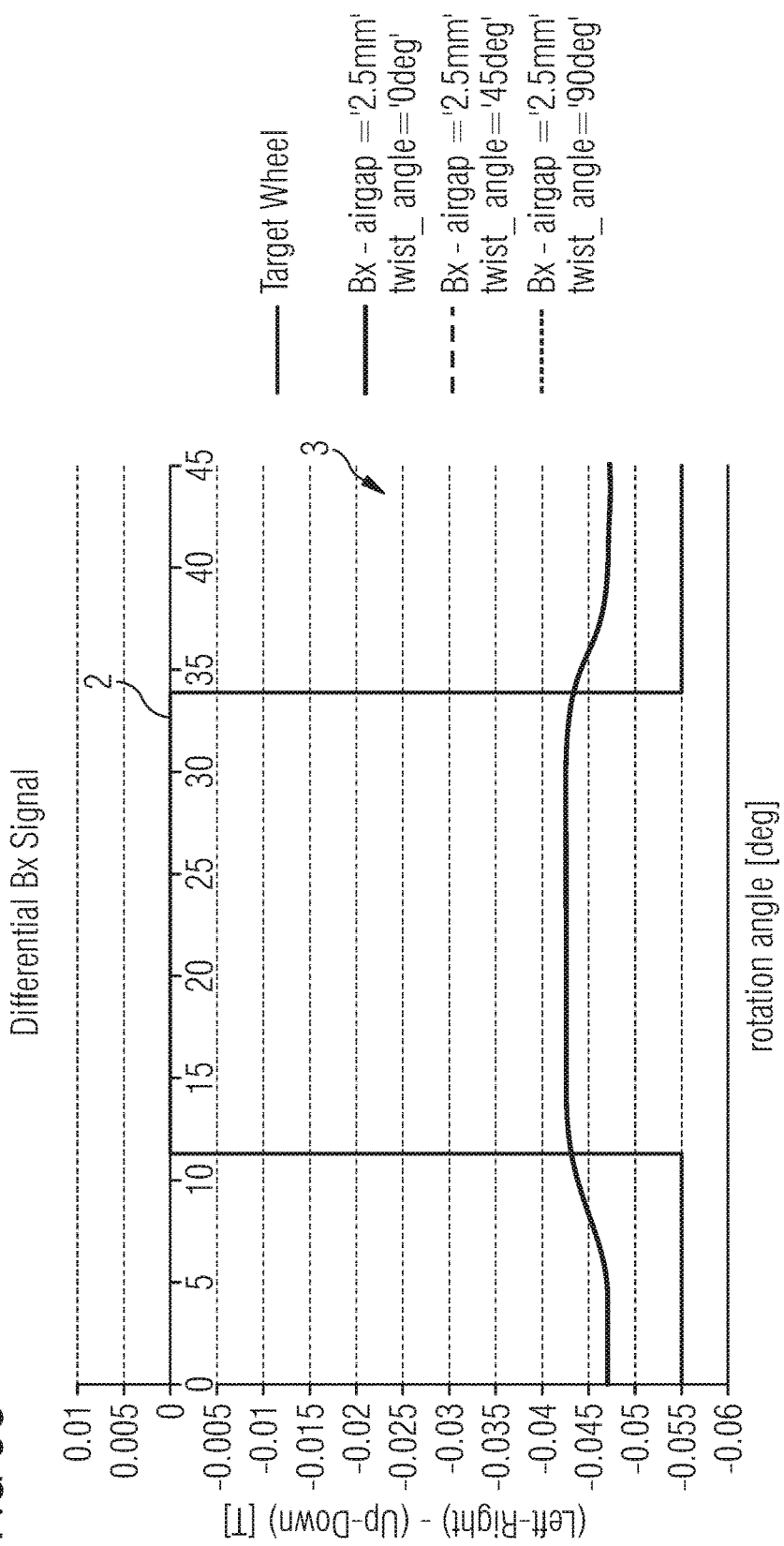

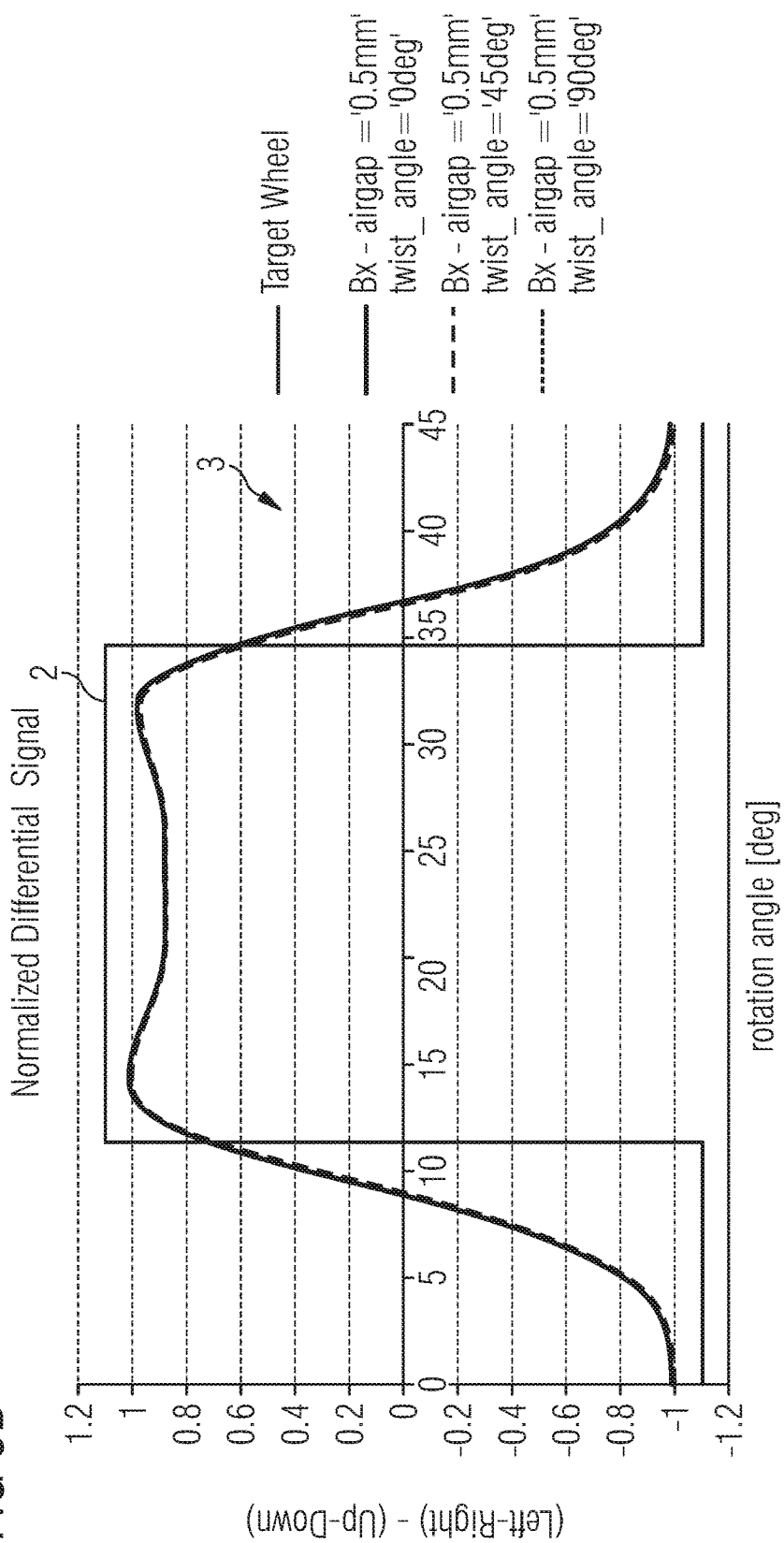

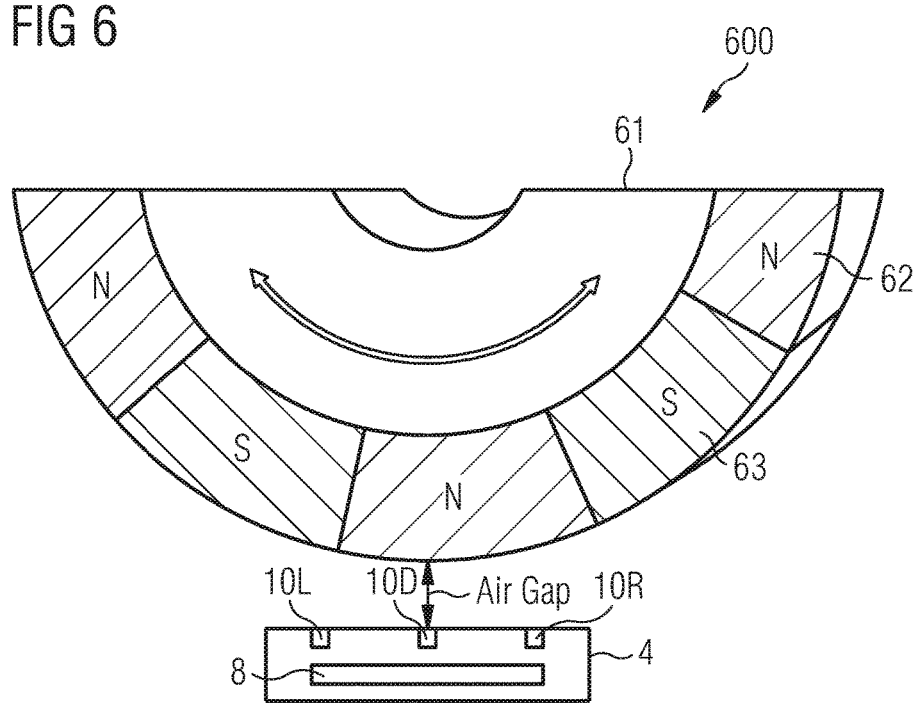

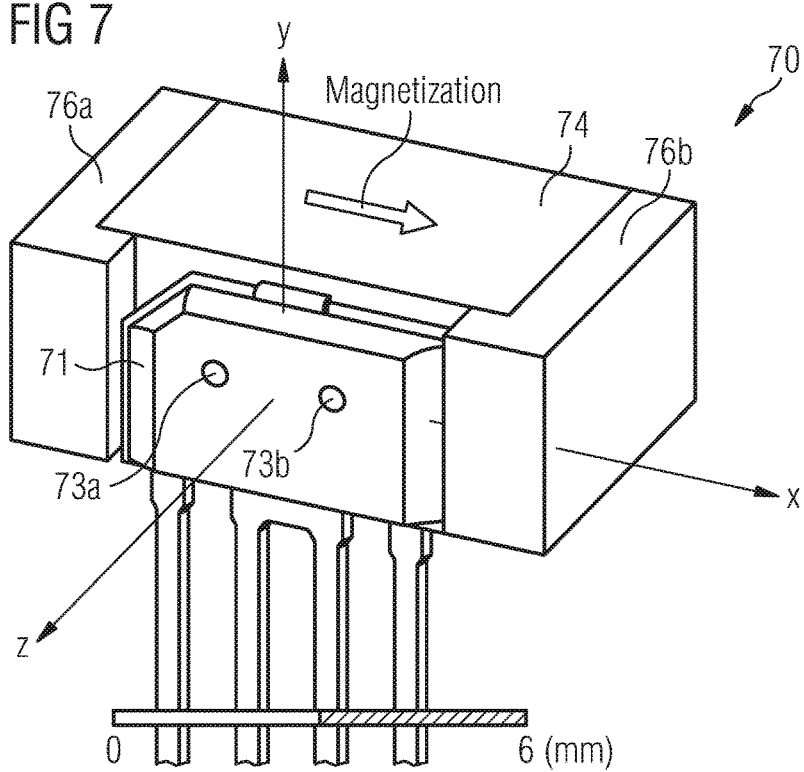
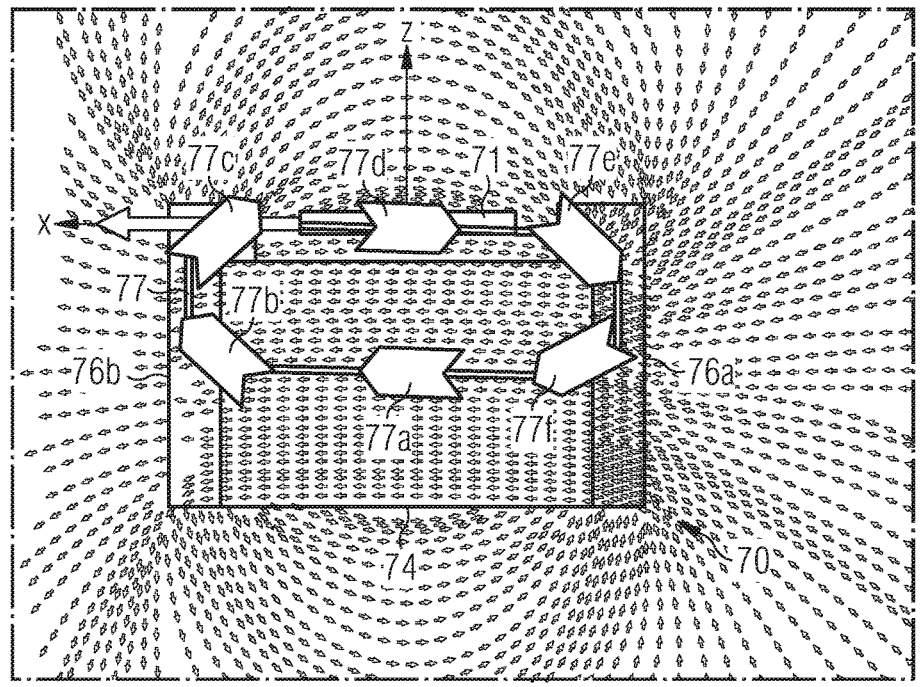

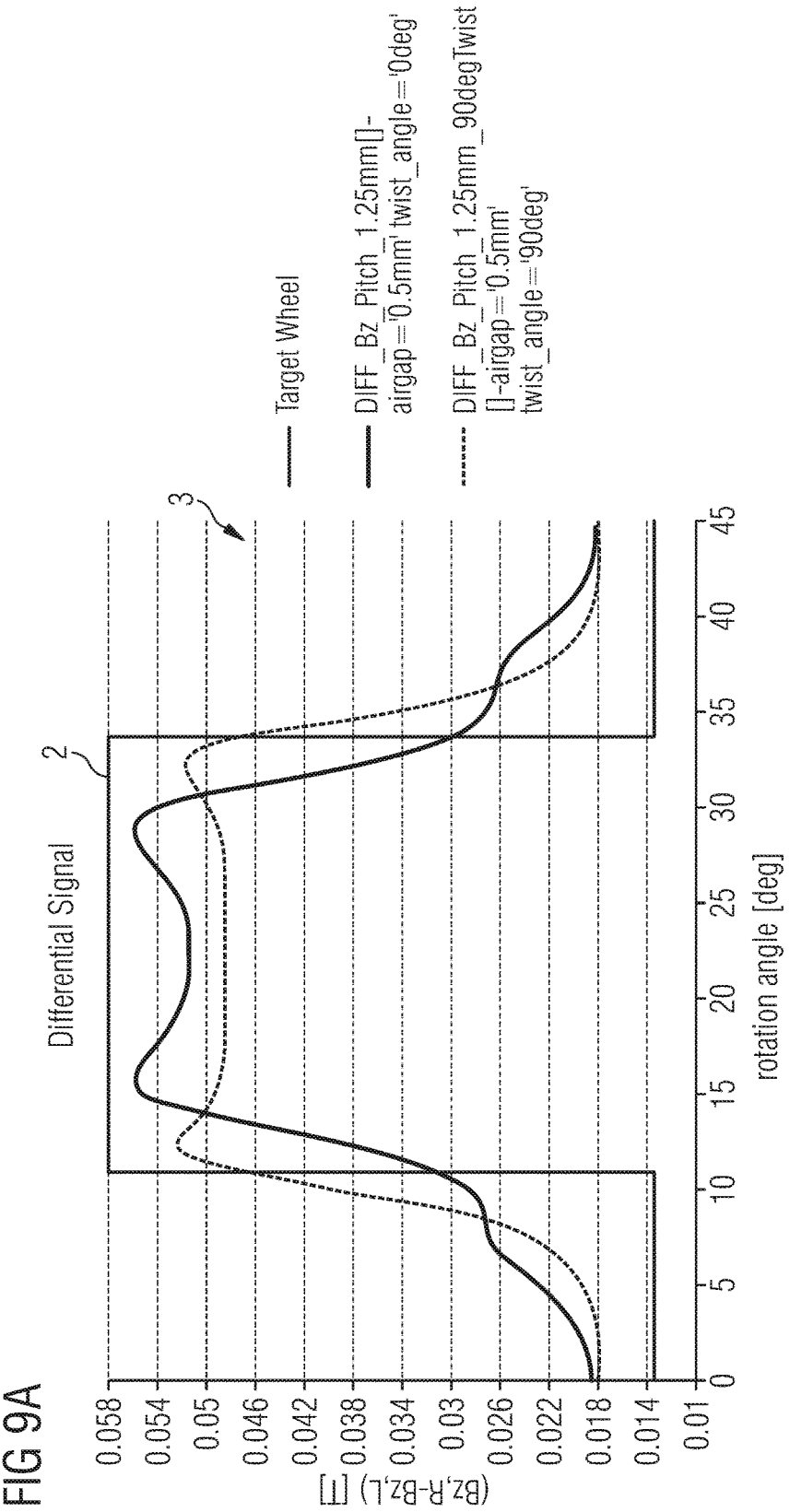

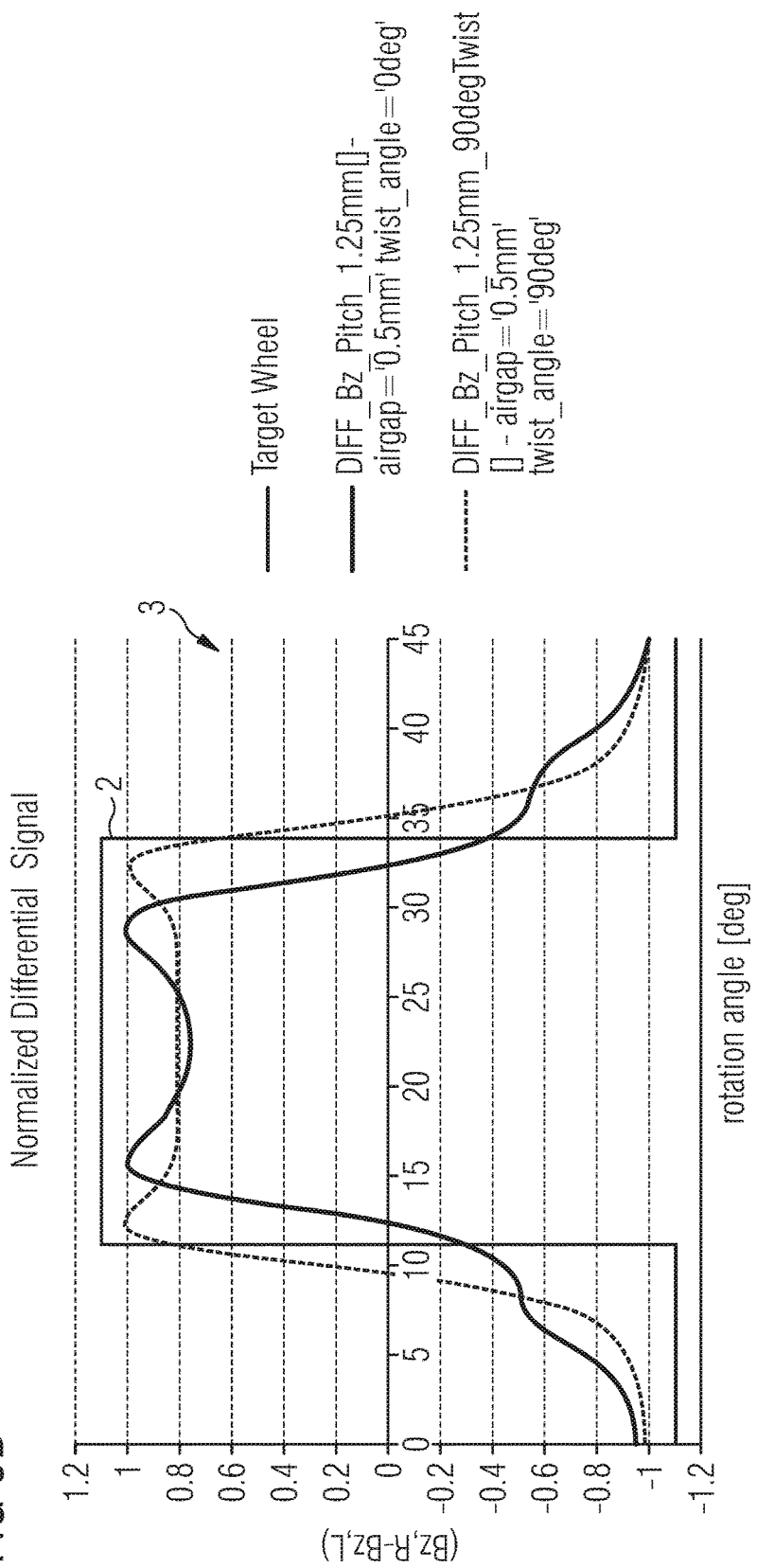

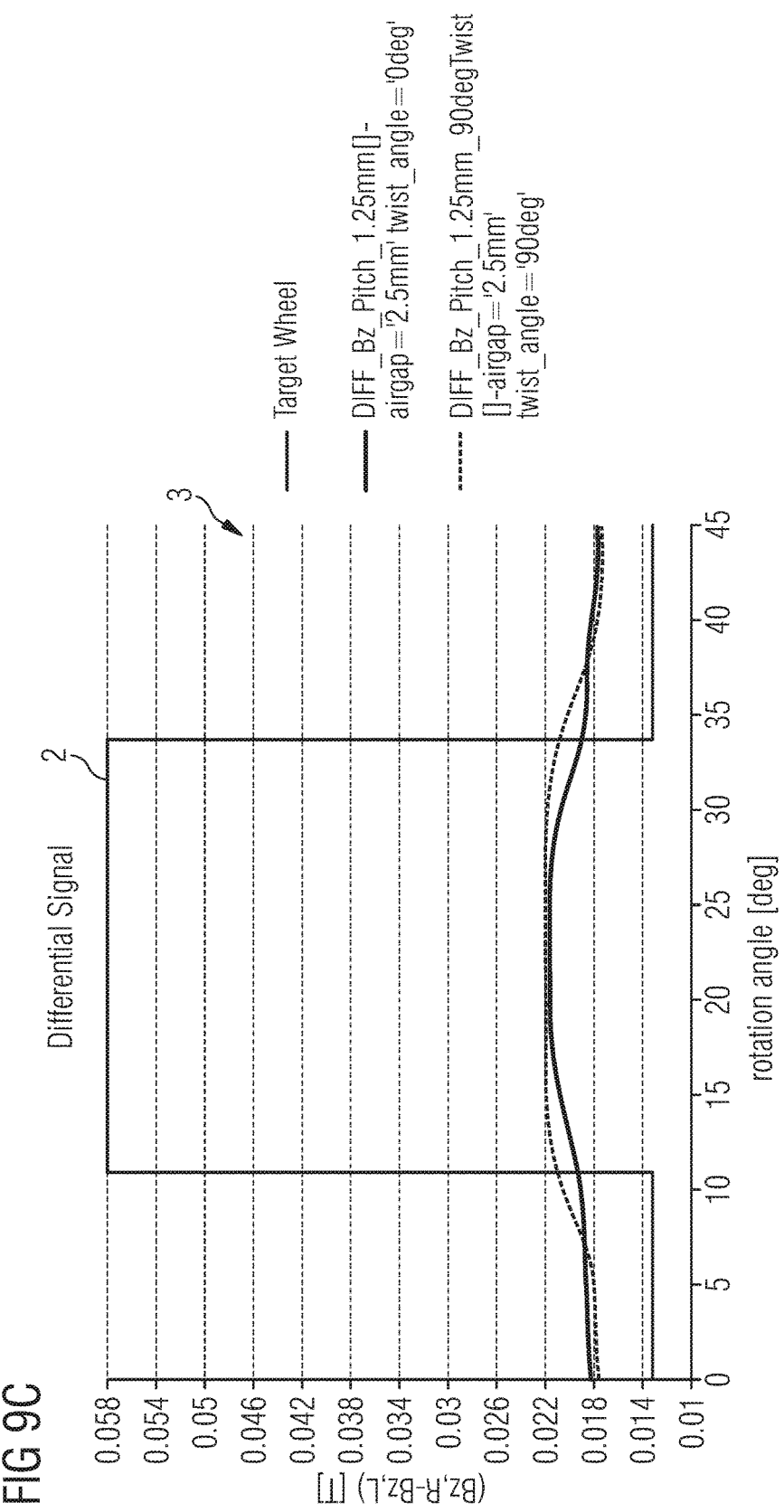

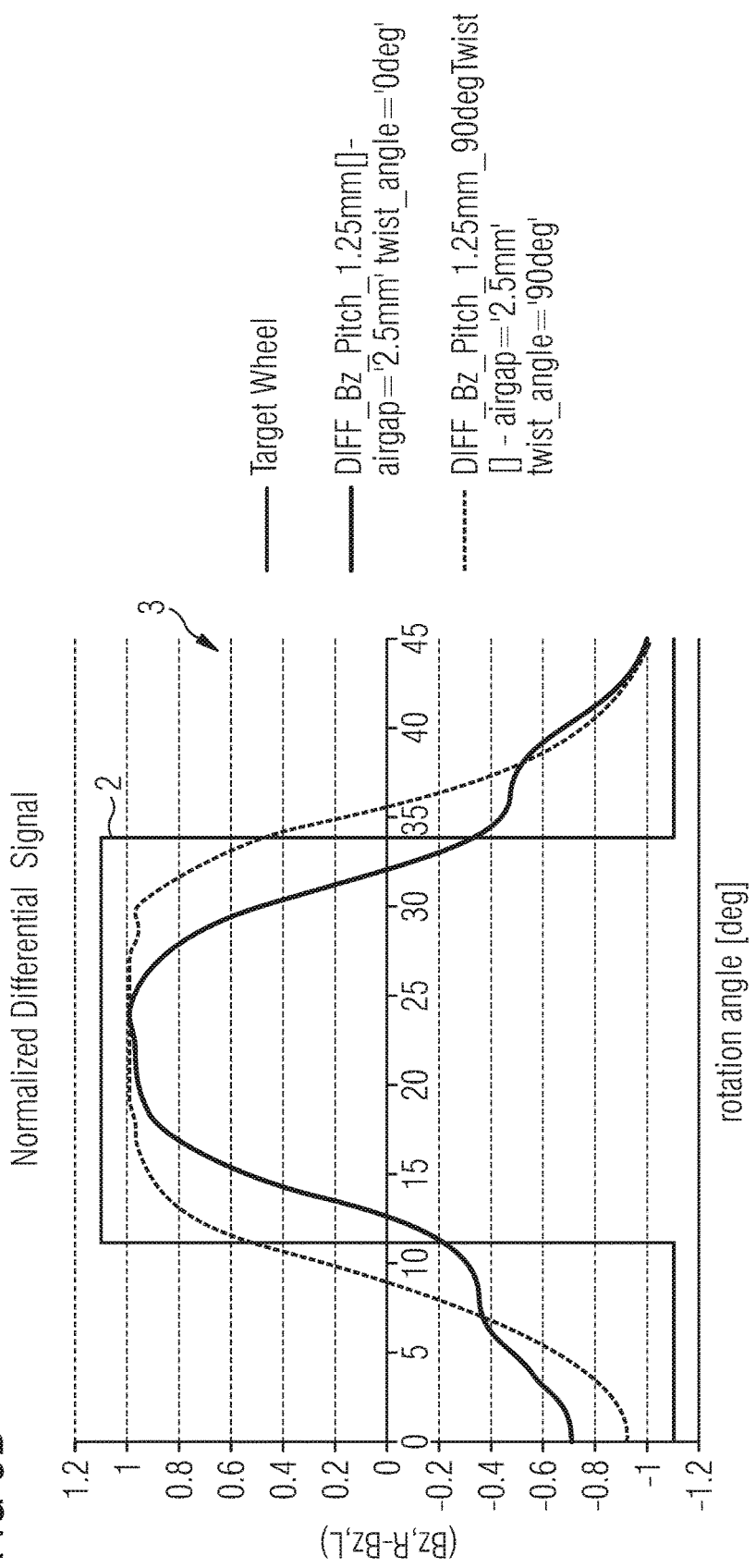

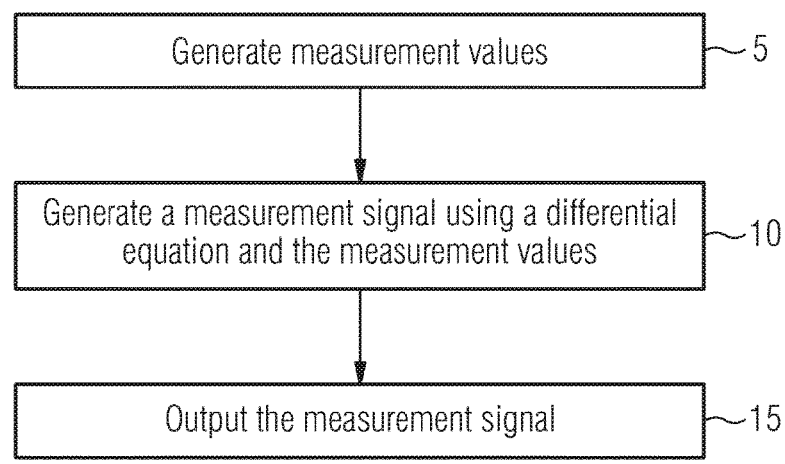

STRAY-FIELD ROBUST, TWIST-INSENSITIVE MAGNETIC SPEED SENSORS

FIELD

The present disclosure relates generally to sensing a wheel speed, and, more particularly, to magnetic speed sensors.

BACKGROUND

To measure wheel speed (e.g., in an automotive application) typically a ferromagnetic wheel is used in combination with a magnetic sensitive sensor and a magnet mounted to the sensor. The sensor generates output-pulses. A control unit counts the pulses and is able to calculate wheel-speed and actual angle of the rotating wheel.

In camshaft sensing applications, a Hall monocell configuration may be used that enables output switching at the tooth edge of a toothed wheel. A z-magnetized back bias sensor in combination with the Bz-sensitive monocell sensor generates a sinusoidal signal as the ferrous target wheel rotates in front of the sensor. The maximum amplitude is achieved when a tooth passes the sensor, while the minimum signal is achieved when the sensor faces a notch of the toothed wheel. Thus, the sensor device switches on the tooth edge.

A benefit in using a Hall monocell sensor is that the sensor is twist-insensitive such that the sensor will work independent from a mounting position regardless of its rotational orientation around its z-axis. Thus, an air-gap between the sensor module and the wheel can be adjusted during mounting using a screw. That is, twisting the sensor module using the screw will adjust the air gap and the rotational orientation of the sensor can be disregarded. Accordingly, the assembly tolerances are relaxed during mounting of the sensor due to the twist-insensitivity.

On the downside, Hall monocell sensors have a disadvantage in terms of stray-field robustness. Stray-fields are magnetic fields that are introduced by external means located in the proximal environment of the sensor. For example, components located within a vehicle (e.g., for hybrid cars due to current rails driving high electrical currents close to the sensing device or due to inductive battery charging) or a currents flowing through a railway of a train system that generates magnetic fields may cause stray-field disturbance.

Alternative to the Hall monocell sensor, differential Hall sensing elements may be used to increase the stray-field robustness. In a differential Hall sensor, two Hall plates are spaced apart. The output signal is calculated by subtracting the Bz signal of the first Hall plate from the Bz signal of the second Hall plate, and a homogeneous stray-field in the z-direction will cancel out due to the differential calculation.

The differential Hall signal has its signal maximum at the rising edge of a tooth of the wheel and its signal minimum at the falling edge of a tooth of the wheel. Thus, in contrast to the Hall monocell sensor, the output of the differential Hall sensor switches on the tooth center and the notch center.

However, because the switching point is different, a vehicle's electronic control unit (ECU) needs to be reconfigured to adjust the switching point. Furthermore, another disadvantage of the differential Hall sensor is that it is not twist-insensitive. Twisting the sensor module around its z-axis, will result in a decreasing signal. The worst case is a twist angle of 90°, where both Hall plates sense the same Bz-field. In this case no differential signal is available and the sensor is not able to detect a tooth or a notch.

Therefore, an improved device that is both twist-intolerant may be desirable.

SUMMARY

Magnetic sensor modules, systems and methods are provided, configured to detect a rotation of an object, and, and more particularly, to detect a speed of rotation of an object.

Embodiments provide a magnetic sensor module including an axially polarized back bias magnet that generates a radially symmetric bias magnetic field about a center axis of the axially polarized back bias magnet in a sensor plane, and a magnetic sensor including a plurality of sensor elements arranged in the sensor plane of the magnetic sensor and are configured to generate measurement values in response to sensing the radially symmetric bias magnetic field. The plurality of sensor elements are arranged on a circumference of a circle at equidistant angles about the center axis of the axially polarized back bias magnet. The plurality of sensor elements are grouped into a plurality of pairs such that first sensor elements of a first pair of sensor elements are arranged opposite to each other on the circumference of the circle and have a first sensitivity-axis sensitive to a first in-plane magnetic field component of the radially symmetric bias magnetic field, and second sensor elements of a second pair of sensor elements are arranged opposite to each other on the circumference of the circle and have a second sensitivity-axis sensitive to a second in-plane magnetic field component of the radially symmetric bias magnetic field.

Embodiments further provide a method of measuring a rotational speed of a rotating member by a magnetic sensor, the magnetic sensor including a plurality of sensor elements arranged in a sensor plane of the magnetic sensor and are exposed to a substantially same working point of a radially symmetric bias magnetic field produced by an axially polarized back bias magnet. The method includes generating measurement values by a plurality of sensor elements in response to sensing the radially symmetric bias magnetic field, where variations in the measurement values of the plurality of sensor elements are caused by a rotation of the rotating member; generating a measurement signal using a differential calculation configured to, based on the measurement values, cancel out stray-fields in both a direction of a first sensitivity-axis of a first pair of sensor elements and a direction of a second sensitivity-axis of a second pair of sensor elements; and outputting the measurement signal. The first pair of sensor elements are sensitive to a first in-plane magnetic field component of the radially symmetric bias magnetic field in the direction of the first sensitivity-axis, the second pair of sensor elements are sensitive to a second in-plane magnetic field component of the radially symmetric bias magnetic field in the direction of the second sensitivity-axis, and the measurement signal oscillates between maximum and minimum values based on a rotational speed of the rotating member.

Embodiments further provide a magnetic sensor module configured to detect a rotation of an object, including a magnetic sensor including a plurality of sensor elements arranged in a sensor plane of the magnetic sensor and are configured to generate measurement values in response to sensing a time varying magnetic field that varies relative to the rotation of the object. The plurality of sensor elements are arranged on a circumference of a circle at substantially equidistant angles, and the plurality of sensor elements are grouped into a plurality of pairs such that each pair has a sensitivity axis sensitive to one in-plane magnetic field component of a plurality of different in-plane magnetic field components of the time varying magnetic field. The magnetic sensor module further includes a sensor circuit configured to receive the measurement values from the plurality of sensor elements, generate at least one measurement signal using a differential calculation configured to cancel out stray-fields in each direction of each of the plurality of different in-plane magnetic field components, and output the at least one measurement signal.

BRIEF DESCRIPTION OF THE DRAWINGS

Embodiments are described herein making reference to the appended drawings.

FIGS. 1A and 1B illustrate a magnetic field sensing principle of a toothed wheel according to one or more embodiments;

FIG. 2 illustrates a plan view of a sensor arrangement according to one or more embodiments;

FIG. 3 illustrates a back bias magnet that is an axially polarized cylinder according to one or more embodiments;

FIG. 4 illustrates a speed sensing system according to one or more embodiments;

FIGS. 5A-5D illustrate output signals of a sensor circuit of a sensor shown in FIG. 4 verse a rotation angle of a target wheel according to one or more embodiments;

FIG. 6 illustrates a sensor system according to one or more embodiments;

FIG. 7 illustrates a sensor module according to one or more embodiments;

FIG. 8 illustrates a plan view of the sensor module of FIG. 7 and showing magnetic field patterns coupled in a loop in an environment around the sensor module according to one or more embodiments;

FIGS. 9A-9D illustrate an output signals of a sensor circuit of a sensor shown in FIG. 7 verse a rotation angle of a target wheel according to one or more embodiments; and FIG. 10 illustrates a flow diagram of a method of measuring a rotational speed of a rotating member by a magnetic sensor according to one or more embodiments.

DETAILED DESCRIPTION

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be a current sensor, gauss meter, an angle sensor, a linear position sensor, a speed sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

According to one or more embodiments, a magnetic field sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with a back bias magnet to form a sensor module, sensor device, or the like.

One or more magnetic field sensor elements, or for short a magnetic field sensors, included in the sensor package is thus exposed to the magnetic field, and the sensor signal (e.g., a voltage signal) provided by each magnetic field sensor element is proportional to the magnitude of the magnetic field, for example. Further, it will be appreciated that the terms "sensor" and "sensing element" may be used interchangeably throughout this description, and the terms "sensor signal" and "measurement value" may be used interchangeably throughout this description.

The sensor circuit may be referred to as a signal processing circuit and/or a signal conditioning circuit that receives the signal (i.e., sensor signal) from the magnetic field sensor element in the form of raw measurement data and derives, from the sensor signal, a measurement signal that represents the magnetic field. The sensor circuit may include a digital converter (ADC) that converts the analog signal from the one or more sensor elements to a digital signal. The sensor circuit may also include a digital signal processor (DSP) that performs some processing on the digital signal, to be discussed below. Therefore, the sensor package comprises a circuit which conditions and amplifies the small signal of the magnetic field sensor via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Magnetic field sensor elements include, but is not limited to, Hall plates, vertical Hall effect devices, or magneto-resistive sensors, often referred to as XMR sensors which is a collective term for anisotropic magneto-resistive (AMR), giant magneto-resistive (GMR), tunneling magneto-resistive (TMR), etc.

FIGS. 1A and 1B illustrate a magnetic field sensing principle of a toothed wheel 1 that has alternating teeth 2 and notches 3 according to one or more embodiments. In particular, the toothed wheel 1 may be made of a ferromagnetic material (e.g., iron) that attracts magnetic fields. In addition, a sensor arrangement 4 is configured to sense a magnetic field produced by an axially polarized back bias magnet 5, where the sensor arrangement 4 and the back bias magnet 5 comprise a sensor module 6. The sensor arrangement 4 may generally be referred to herein as a sensor and may be disposed in a sensor package. The axially polarized magnet 5 creates a radially symmetric bias magnetic field in the sensor package plane (i.e., chip plane). A diametrically polarized cylinder may be used as the axially polarized magnet 5. The magnetic field produced by the axially polarized magnet 5 is zero at the center of the magnet (i.e., at its center axis) and increases in a radial direction from the center axis (e.g., the z-axis as shown). Thus, an in-plane magnetic field is created by the magnet 5.

Here, the sensor plane(s) of the sensor elements within the sensor arrangement 4 are arranged parallel to the in-plane components of the magnetic field. The sensor planes, as shown in FIGS. 1A and 1B, are aligned in the x and y-directions, perpendicular to each other, and represent the sensitivity-axis of the sensor elements such that the sensor elements are sensitive to the in-plane magnetic field component Bx (i.e., the magnetic field in the x-plane) or to the in-plane magnetic field component By (i.e., the magnetic field in the y-plane) of the sensor arrangement 4. Thus, the sensor elements are sensitive to the radially symmetric bias magnetic field produced by the magnet 5.

FIG. 1A shows a tooth 2 of wheel 1 passing the sensor module 6. In this instance, the magnetic field lines of the radially symmetric bias magnetic field produced by the back bias magnet 5 are pulled in the z-direction towards the tooth 2. Thus, the magnetic field lines are pulled away from the x and y-axes (i.e., the sensor planes) and the sensed magnetic field strength in the x and y-directions is reduced such that a minimum field strength is detected at the center of the tooth 2. This may differ in real-world applications where the minimum may not occur exactly at the center due to assembly tolerances, but the minimum field strength should be detected substantially at the center of the tooth 2.

Conversely, FIG. 1B shows a notch 3 of wheel 1 passing the sensor module 6. In this instance, the magnetic field lines of the radially symmetric bias magnetic field produced by the back bias magnet 5 are not pulled (or less pulled) in the z-direction towards the notch 3. Thus, the magnetic field lines remain concentrated relative to the x and y-axes (i.e., the sensor planes) and the sensed magnetic field strength in the x and y-directions are at a maximum at the center of the notch 3. This may differ in real-world applications where the maximum may not occur exactly at the center, but the maximum field strength should be detected substantially at the center of the notch 3.

As the wheel 1 rotates, the teeth 2 and notches 3 alternate past the sensor module 6 and the sensor elements within the sensor arrangement 4 sense a change in the x-axis and y-axis magnetic field strength that varies as a sinusoidal waveform (i.e., as a signal modulation), the frequency of which corresponds to a speed of rotation of the wheel, which further corresponds to a speed of rotation of a drive shaft (e.g., camshaft) that drives the rotation of the wheel. Thus, the sensor circuit of the sensor arrangement 4 that receives signals (i.e., sensor signals) from the magnetic field sensor elements and derives, from the sensor signals, a measurement signal that represents the magnetic field as a signal modulation. The measurement signal may then be output as an output signal to an external controller, control unit or processor (e.g., an ECU). The external device counts the pulses of the output signal and is able to calculate wheel-speed and an actual angle of the rotating wheel.

FIG. 2 illustrates a plan view of the sensor arrangement 4 according to one or more embodiments. As used herein, the sensor arrangement 4 may also be referred to as a sensor chip layout, single die sensor or magnetic sensor and includes at least four magnetic field sensor elements 10L, 10R, 10U, and 10D (collectively referred to as sensor elements 10), and a sensor circuit 8. The sensor elements 10 are arranged on a circumference of a circle 12 with equidistant spacing from each other. Thus, the sensor elements 10 are spatially distributed equally about a center axis 11 of the circle 12 such that all sensor elements 10 are exposed to substantially the same (due to typical assembly tolerances of 3%), or exactly the same magnetic field working point. For example, as noted above, the radially symmetric magnetic field produced by the axially polarized magnet 5 is zero at the center of the magnet (i.e., at its center axis) and increases in a radial direction from the center axis (e.g., from the z-axis as shown). Thus, the center point of the circle 12 is arranged to coincided with the center axis of the magnet 5 so that each sensor element 10 is exposed to substantially the same (due to typical assembly tolerances of 3%), or exactly the same magnetic field working point.

The sensor elements 10 may be, for example, single-axis or multi-axis XMR sensor elements that have a sensing axis utilized for the speed sensor that is aligned with one of the in-plane magnetic field components Bx or By. Here, as similarly described above with reference to FIGS. 1A and 1B, it is assumed for this example that the back bias magnet 5 produces a radially symmetric bias magnetic field. Additionally, sensor's transfer function has a high linear range (+/−25 mT) and is in a wide range independent from bias fields. That is, each sensor element 10 is sensitive to a first magnetic in-plane field component (e.g., a Bx component) and, at the same time, it is independent from (or insensitive to) a second magnetic in-plan field component (e.g., a By component).

The arrows on each sensor element 10 indicate a direction of the reference layer of the sensor element 10 having a reference direction such that the reference direction of sensor elements 10L, 10R are the same and the reference direction of sensor elements 10U, 10D are the same. Thus, sensor elements 10L and 10R share their same reference direction, and sensor elements 10U and 10D share their own same reference direction. Moreover, the sign of the pairwise reference directions is also invertible. This means in another embodiment, sensor elements 10L and 10R may also be sensitive to the −Bx direction, while sensor elements 10U and 10D may be sensitive to the −By direction. Accordingly, if the magnetic field points exactly in the same direction as the reference direction, the resistance of the XMR sensor element is at a maximum, and, if the magnetic field points exactly in the opposite direction as the reference direction, the resistance of the XMR sensor element is at a minimum.

According to this example, oppositely disposed sensor elements 10L and 10R may have a sensing axis in the x-direction configured for sensing the in-plane magnetic field component Bx (i.e., sensitive to magnetic fields in the x-plane). Similarly, oppositely disposed sensor elements 10U and 10D may have a sensing axis in the y-direction configured for sensing the in-plane magnetic field component By (i.e., sensitive to magnetic fields in the y-plane).

The sensor signals of each sensor element 10 is provided to the sensor circuit 8 that calculates an output signal using a differential calculation that cancels out the homogeneous stray-fields in the x and y-directions, and out-of-plane magnetic field components do not affect the output signal (i.e., the sensor output). The output signal $R_{OUT}$ is calculated, for example, by the following equation:

$$R_{OUT}=R_{LEFT}-R_{RIGHT}-(R_{UP}-R_{DOWN}) \quad (1), \text{ or}$$

$$V_{OUT}=V_{LEFT}-V_{RIGHT}-(V_{UP}-V_{DOWN}) \quad (2).$$

Here, $R_{LEFT}$ corresponds to a resistance value of sensor element 10L, $R_{RIGHT}$ corresponds to a resistance value of sensor element 10R, $R_{UP}$ corresponds to a resistance value of sensor element 10U, and $R_{DOWN}$ corresponds to a resistance value of sensor element 10D. Furthermore, $V_{LEFT}$ corresponds to a voltage value of sensor element 10L, $V_{RIGHT}$ corresponds to a voltage value of sensor element 10R, $V_{UP}$ corresponds to a voltage value of sensor element 10U, and $V_{DOWN}$ corresponds to a voltage value of sensor element 10D. Equations (1) and (2) can be generalized as follows:

$$SE_{OUT}=SE_A-SE_B-(SE_C-SE_D) \quad (3),$$

where SE corresponds to sensor element, and $SE_A$ and $SE_B$ correspond to a first pair of oppositely disposed sensor elements, and $SE_C$ and $SE_D$ correspond to a second pair of oppositely disposed sensor elements.

As the sensor elements 10 are XMR sensor elements, the resistance values change depending on the magnetic field strength in the direction of the sensing axis, and the resistance values of the XMR sensor elements may be detected by the sensor circuit 8 or may be output from the senor element as a voltage value that is representative of the resistance value (i.e., the voltage value changes as the resistance value changes). In the former case, the resistance value is output as a sensor signal, and, in the latter case, the voltage value is output as a sensor signal, however, the sensor signal is not limited thereto. Thus, external stray-fields in the sensor plane will cancel out due to the differential calculus and out-of-plane magnetic field components do not affect the sensor output.

Alternatively, the sensor elements 10 may be, for example, vertical Hall sensor elements (e.g., Hall plates) that have a sensing axis utilized for the speed sensor that is aligned with one of the in-plane magnetic field components Bx or By. In vertical Hall sensor elements, voltage values output by the sensor elements 10 change according to the magnetic field strength in the direction of the sensing axis. Thus, external stray-fields in the sensor plane will cancel out due to the differential calculus and out-of-plane magnetic field components do not affect the sensor output.

Thus, the sensor elements 10 may be any sensor element sensitive to and, thus capable of detecting, a magnetic field in an in-plane direction. For example, oppositely disposed sensor elements 10L and 10R may have a sensing axis aligned in the x-direction configured for sensing the in-plane magnetic field component Bx (i.e., sensitive to magnetic fields in the x-plane). Similarly, oppositely disposed sensor elements 10U and 10D may have a sensing axis aligned in the y-direction configured for sensing the in-plane magnetic field component By (i.e., sensitive to magnetic fields in the y-plane).

In addition, the sensor module 6 includes an axially polarized cylinder magnet, where its center axis points towards the wheel 1 and coincides with center axis 11. Thus, the magnet creates a radially symmetric bias magnetic field in the sensor plane such that each sensor element 10 is exposed to substantially the same (due to typical assembly tolerances of 3%), or exactly the same magnetic field working point. The magnet may be any shape that produces a radially symmetric magnetic field (e.g., cylinder, cube, etc.).

For example, FIG. 3 illustrates a back bias magnet 15 that is an axially polarized cylinder according to one or more embodiments. FIG. 3 further shows the in-plane magnetic field distribution in the sensor plane. The magnetic field is zero in the center of the plane and increases in the radial direction. Thus, due to the radially symmetric field distribution, all four sensor elements 10 are exposed to substantially the same (due to typical assembly tolerances of 3%), or exactly the same magnetic field working point.

FIG. 4 illustrates a speed sensing system 400, including a sensor module 16, according to one or more embodiments. In particular, a portion of wheel 1 is shown with an air gap 17 between the wheel 1 and the sensor module 16, and, more particularly, between the wheel 1 and the sensor arrangement 4. The sensor arrangement 4 is disposed on or coupled to the cylinder back bias magnet 15 such that the center point between the sensor elements 10 (e.g., the center 11 of circle 12) is aligned on the center point (i.e., the center axis) of the magnet 15. As described above, the sensor arrangement 4 (i.e., the sensor) includes magnetic sensor elements 10 and an IC for signal conditioning.

FIGS. 5A-5D illustrate output signals of a sensor circuit of a sensor shown in FIG. 4 verse a rotation angle of a target wheel according to one or more embodiments. The x-axis, for example, illustrates a rotation angle of the target wheel, illustrating a partial revolution of the target wheel from 0° to 45°. FIGS. 5B and 5D are normalized representations of their counterpart graphs shown in FIGS. 5A and 5C, respectively.

In particular, the output signals illustrated in FIGS. 5A and 5B are differential sensor signals after applying one of equations (1) or (2) to the sensor signals of the sensor elements 10 with an air gap of 0.5 mm. The shape of the target wheel (tooth 2 and notches 3) is represented by a rectangular shaped function in each graph. Different twist angles (0°, 45° and 90°) of the sensor module 16 around its z-axis are superimposed on each graph. The rotation of the target wheel starts, for example, at 0° (at this step the sensor faces a notch 3), at 22.5° the sensor faces the middle of the tooth 2, and at 45° the sensor faces another notch 3.

As can be seen, the twist of the sensor module 16 has little effect on the output signals. In particular, the rotation of the target wheel modulates the magnetic field, and a clear signal change (modulation) as a function of the wheel rotation angle is illustrated in the graphs shown in FIGS. 5A and 5B. However, the normalized curves for the different twist angles nearly overlap each other in FIG. 5B. From this observation, it can be concluded that the twist of the sensor module 16 around its z-axis has almost no effect on the output signal.

Furthermore, as can be observed in FIG. 5B, showing the normalized differential signals of FIG. 5A, the output switching behavior switches on the tooth edge where the output signal crosses the x-axis on the graph. Alternatively, the sensor may be programmed to switch at an arbitrary threshold level of the output signal. For instance at 70% of the signal level. Thus, is it not stringent that the sensor switches exactly the crossing with the x-axis.

Similarly, the output signals illustrated in FIGS. 5C and 5D are differential sensor signals after applying one of equations (1) or (2) to the sensor signals of the sensor elements 10 with an air gap of 2.5 mm. Again, different twist angles (0°, 45° and 90°) of the sensor module 16 around its z-axis are superimposed on each graph. The rotation of the target wheel starts, for example, at 0° (at this step the sensor faces a notch 3), at 22.5° the sensor faces the middle of the tooth 2, and at 45° the sensor faces another notch 3.

Despite the increase in air gap compared to the air gap used in FIGS. 5A and 5B, the twist of the sensor module 16 has little effect on the output signals. This phenomenon is observed from the nearly overlapping (normalized) curves for the different twist angles shown in FIG. 5D.

Furthermore, as can be observed in FIG. 5D, showing the normalized differential signals of FIG. 5C, the output switching behavior switches on the tooth edge where the output signal crosses the x-axis on the graph. Alternatively, the sensor may be programmed to switch at an arbitrary threshold level of the output signal. For instance at 70% of the signal level. Thus, is it not stringent that the sensor switches exactly the crossing with the x-axis.

In view of FIGS. 5A-5D, the output signal may be independent from the mounting angle (i.e., independent of a twisting angle around its z-axis). The sensor arrangement 4 may be robust against stray-fields due to differential signal calculation that cancels out homogeneous stray-fields in both in-plane directions (i.e., the x and y-planes), and out-of-plane magnetic field components do not affect the output signal. The output signal of the sensor circuit 8 complies with output switching on the tooth edge. Thus, there is no need to reconfigure an external control unit (e.g., an ECU) during installation. Furthermore, a simple axially polarized cylinder back bias magnet is sufficient. Accordingly, the described embodiments offer stray-field robust, twist-insensitive sensing of the wheel, and it comes with a low cost magnetic back bias solution (e.g., a sintered ferrite cylinder magnet). Alternatively, other types of magnets (e.g., a rare earth magnet) may also be suitable as a back bias magnet.

It is noted that, while the embodiments refer to four sensor elements 10, any even number of N sensor elements of four or more may be implemented, such that oppositely disposed sensor elements (i.e., each oppositely disposed sensor element pair such as sensor elements 10R and 10L or sensor elements 10U and 10D) have the same reference direction that is parallel to a radial direction that intersects with the center axis 11 of the circle 12, and that the N sensor elements are aligned at equidistant angles about the circle 12.

FIG. 6 illustrates an alternative embodiment to the sensor system 600 shown in FIG. 4. In particular, FIG. 6 shows a sensor system 600 that includes an magnetized encoder wheel 61 comprised of alternating north pole sections 62 and south pole sections 63. Accordingly, the north pole sections 62 and south pole sections 63 represent teeth and notches of a tooth and notch wheel described above. The sensor elements 10 of sensor arrangement 4, as described in reference to FIG. 2, are sensitive to magnetic fields influenced by the north pole sections 62 and south pole sections 63 of the wheel 61. Here, since the magnetic field is actively generated by the wheel 61, a back bias magnet can be omitted. Thus, the sensor circuit 8 of the sensor arrangement 4 generates a sensor output that corresponds to the rotational speed of the wheel 61 by detecting the change of the alternating magnetic field.

The sensor circuit 8 may transmit the sensor output signal (i.e., the differential signal) to an external processor or controller unit, such as an ECU for speed calculation and determination, which in turn may provide a speed measurement to a user or other processing or output component, such as a display. Alternatively, the sensor circuit 8 may be bypassed and the external processor or controller unit may receive the sensor signals from the sensor elements 10 for calculating the differential signal and calculating a wheel rotation speed from the differential signal.

FIG. 7 illustrates a sensor module 70 according to one or more embodiments. In particular, FIG. 7 shows a differential lateral Hall sensor, and a magnetic back bias circuit that enables twist-insensitive and stray-field robust sensing of the target wheel (e.g., a toothed wheel).

The sensor module 70 includes a sensor package 71 with lead frame 72 extending therefrom, a back bias magnet 74 located on a back side of the sensor package 71 and magnetized in the (in-plane) x-direction, a first magnetic flux guide 76a, and a second magnetic flux guide 76b.

The sensor package 71 includes a first lateral Hall sensor element (e.g., Hall plate) 73a, a second lateral Hall sensor element (e.g., Hall plate) 73b, and a sensor circuit (not shown). The first lateral Hall sensor element 73a and the second lateral Hall sensor element 73b (commonly referred to as sensor elements 73) have a sensitivity-axis aligned parallel to the z-axis, which is an out-of-plane component of the sensor package 71 and are sensitive to magnetic field component Bz (i.e., the magnetic field in the z-plane). Here, a back side of the sensor package 71 refers to the side that is furthest from the target wheel and a front side of the sensor package 71 faces the target wheel in the z-direction.

The back bias magnet 74 is magnetized in the x-direction, parallel to the in-plane component of the sensor package 71. The back bias magnet 74 may be, for example, a block or cylinder magnet placed between the a first magnetic flux guide 76a, and a second magnetic flux guide 76b, and coupled to the back side of the sensor package 71.

The first magnetic flux guide 76a and the second magnetic flux guide 76b are located at opposite poles of the magnet 74 and made of a material (e.g., iron) capable of redirecting the magnetic field produced by the magnet 74. In particular, FIG. 8 illustrates a plan view of the sensor module 70 showing magnetic field patterns coupled in a loop 77 in the environment around the sensor module 70. As the magnet 74 is magnetized in the x-direction, the magnetic B-field (flux lines) starts in an x-direction at point 77a, a portion of the magnetic B-field is redirected by the second magnetic flux guide 76b at points 77b and 77c such that the magnet B-field is directed, anti-parallel to the x-direction, through the (in-plane) x-plane of the sensor package 71 at point 77d, and a portion of the magnetic B-field is redirected again by the first magnetic flux guide 76a at points 77e and 77f such that the magnet B-field is directed back in the x-direction.

In absence of the ferrous target wheel (or in front of a notch), the magnetic B-field will exit from the second magnetic flux guide 76b and directly couple into the first magnetic flux guide 76a again. Thus, there is a strong negative Bx-field and almost no Bz or By field at the sensor location (i.e., at the sensor elements 73). Thus, the Bz-sensitive Hall plates are exposed to low Bz-fields, with a small offset. The Bz-field on the first lateral Hall sensor element 73a and second lateral Hall sensor element 73b are measured with opposite sign. For example, the sensor signal generated by the first lateral Hall sensor element 73a may be a low value (e.g., corresponding to −8 mT), and the sensor signal generated by the second lateral Hall sensor element 73b may be a low value with opposite sign (e.g., corresponding to +8 mT). Thus, the absolute values of the sensor signals are equal.

Conversely, in the presence of the wheel (or in front of a tooth), the magnetic field will be pulled in z-direction towards the target wheel. The Bz-field on the first lateral Hall sensor element 73a and second lateral Hall sensor element 73b increases with opposite sign due to the increase in Bz-field strength. That is, as the sensor signal generated by the first lateral Hall sensor element 73a becomes more negative (e.g., corresponding to −11 mT), the sensor signal generated by the second lateral Hall sensor element 73b becomes more positive by the same amount (e.g., corresponding to +11 mT). Thus, the absolute values of the sensor signals are equal.

In this way a signal modulation can be obtained by the sensor circuit as the wheel rotates in front of the sensor module 70. The modulation is always present, independent from the mounting angle (i.e., e.g., the sensor rotation around its z-axis), and robust against stray-fields as they are canceled out by the differential configuration of the sensor elements 73. It should be noted that it may be preferable that the mid-point between sensor elements 73 should be placed on a lateral mid-point of the magnet 74 such that the (absolute) opposite sign values of the senor signals are maintained equal.

FIGS. 9A-9D illustrate output signals of a sensor circuit of a sensor shown in FIG. 7 verse a rotation angle of a target wheel according to one or more embodiments. The x-axis, for example, illustrates a rotation angle of the target wheel, illustrating a partial revolution of the target wheel from 0° to 45°. FIGS. 9B and 9D are normalized representations of their counterpart graphs shown in FIGS. 9A and 9C, respectively.

In particular, the output signals illustrated in FIGS. 9A and 9B are differential sensor signals after applying a differential equation (e.g., BzLEFT (73a)−BzRIGHT (73b)) to the sensor signals of the sensor elements with an air gap of 0.5 mm. The shape of the target wheel (tooth 2 and notches 3) is represented by a rectangular shaped function in each graph. Different twist angles (0° and 90°) of the sensor module 70 around its z-axis are superimposed on each graph. The rotation of the target wheel starts, for example, at 0° (at this step the sensor faces a notch 3), at 22.5° the sensor faces the middle of the tooth 2, and at 45° the sensor faces another notch 3.

As can be seen, the twist of the sensor module 70 has little effect on the output signals. In particular, the rotation of the target wheel modulates the magnetic field, and a clear signal change (modulation) as a function of the wheel rotation angle is illustrated in the graphs shown in FIGS. 9A and 9B. However, the normalized curves for the different twist angles nearly overlap each other in FIG. 9B. From this observation, it can be concluded that the twist of the sensor module 70 around its z-axis has almost no effect on the output signal.

Furthermore, as can be observed in FIG. 9B, showing the normalized differential signals of FIG. 9A, the output switching behavior switches on the tooth edge where the output signal crosses the x-axis on the graph. Alternatively, the sensor may be programmed to switch at an arbitrary threshold level of the output signal. For instance at 70% of the signal level. Thus, is it not stringent that the sensor switches exactly the crossing with the x-axis.

Similarly, the output signals illustrated in FIGS. 9C and 9D are differential sensor signals after applying a differential equation (e.g., BzLEFT (73a)−BzRIGHT (73b)) to the sensor signals of the sensor elements with an air gap of 2.5 mm. Again, different twist angles (0° and 90°) of the sensor module 70 around its z-axis are superimposed on each graph. The rotation of the target wheel starts, for example, at 0° (at this step the sensor faces a notch 3), at 22.5° the sensor faces the middle of the tooth 2, and at 45° the sensor faces another notch 3.

Despite the increase in air gap compared to the air gap used in FIGS. 9A and 9B, the twist of the sensor module 70 has little effect on the output signals. This phenomenon is observed from the nearly overlapping (normalized) curves for the different twist angles shown in FIG. 9D.

Furthermore, as can be observed in FIG. 9D, showing the normalized differential signals of FIG. 9C, the output switching behavior switches on the tooth edge where the output signal crosses the x-axis on the graph. Alternatively, the sensor may be programmed to switch at an arbitrary threshold level of the output signal. For instance at 70% of the signal level. Thus, is it not stringent that the sensor switches exactly the crossing with the x-axis.

The sensor circuit may transmit the sensor output signal (i.e., the differential signal) to an external processor or controller unit, such as an ECU for speed calculation and determination, which in turn may provide a speed measurement to a user or other component. Alternatively, the sensor circuit may be bypassed and the external processor or controller unit may receive the sensor signals from the sensor elements 73 for calculating the differential signal and calculating a wheel rotation speed from the differential signal.

FIG. 10 illustrates a flow diagram of a method 1000 of measuring a rotational speed of a rotating member by a magnetic sensor according to one or more embodiments. As noted above, the magnetic sensor including a plurality of sensor elements arranged in a sensor plane of the magnetic sensor and are exposed to a substantially same working point of a radially symmetric bias magnetic field produced by an axially polarized back bias magnet. The method includes generating measurement values by a plurality of sensor elements in response to sensing the radially symmetric bias magnetic field (operation 5). The variations in the measurement values of the plurality of sensor elements are caused by a rotation of the rotating member. The method further includes generating a measurement signal using a differential calculation with the measurement values as inputs to the differential calculation (operation 10). The differential calculation, performed by a processor, is configured to, based on the measurement values, cancel out stray-fields in both a direction of a first sensitivity-axis of a first pair of sensor elements and a direction of a second sensitivity-axis of a second pair of sensor elements. The first pair of sensor elements are sensitive to a first in-plane magnetic field component of the radially symmetric bias magnetic field in the direction of the first sensitivity-axis, and the second pair of sensor elements are sensitive to a second in-plane magnetic field component of the radially symmetric bias magnetic field in the direction of the second sensitivity-axis. Accordingly, the measurement signal oscillates between maximum and minimum values based on a rotational speed of the rotating member. Lastly, the method includes outputting the measurement signal to an external device (operation 15), such as an ECU, for further processing. The measurement signal may be output by transmission along a wired connection or a wireless connection.

In view of the above, assembly tolerances can be relaxed by implementing the sensor modules described above due to their twist-insensitivity and stray-field robustness.

While the above embodiments are described in the context of detecting a wheel or camshaft speed, the sensor may be used to detect the rotation speed of any rotating member or object that creates sinusoidal variations in a magnetic field as it rotates and that may be sensed by a sensor. For example, a combination of a ferrous wheel and a back bias magnet may be used to generate a time varying magnetic field. Alternatively, an active encoder wheel (without a back bias magnetic) may be used to generate a time varying magnetic field.

Further, while various embodiments have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A magnetic sensor module configured to detect a rotation of an object, comprising:
    an axially polarized back bias magnet that generates a radially symmetric bias magnetic field about a center axis of the axially polarized back bias magnet in a sensor plane;
    a magnetic sensor including a plurality of sensor elements arranged in the sensor plane of the magnetic sensor and are configured to generate measurement values in response to sensing the radially symmetric bias magnetic field,
    wherein the plurality of sensor elements are arranged on a circumference of a circle at substantially equidistant angles about the center axis of the axially polarized back bias magnet,
    wherein plurality of sensor elements are grouped into a plurality of pairs,
    wherein first sensor elements of a first pair of sensor elements are arranged opposite to each other on the circumference of the circle and have a first sensitivity-axis sensitive to a first in-plane magnetic field component of the radially symmetric bias magnetic field, and
    wherein second sensor elements of a second pair of sensor elements are arranged opposite to each other on the circumference of the circle and have a second sensitivity-axis sensitive to a second in-plane magnetic field component of the radially symmetric bias magnetic field.

2. The magnetic sensor module of claim 1, wherein the first sensitivity-axis is perpendicular to the second sensitivity-axis.

3. The magnetic sensor module of claim 1, wherein the first sensitivity-axis and the second sensitivity-axis intersect with the center axis of the axially polarized back bias magnet and are perpendicular thereto.

4. The magnetic sensor module of claim 1, wherein each of the plurality of sensor elements are exposed to a substantially same working point of the radially symmetric bias magnetic field.

5. The magnetic sensor module of claim 1, wherein:
    the measurement values generated by the first sensor elements change upon detecting a change in a magnetic field strength of the radially symmetric bias magnetic field in a first direction of the first sensitivity-axis, and
    the measurement values generated by the second sensor elements change upon detecting a change in the magnetic field strength of the radially symmetric bias magnetic field in a second direction of the second sensitivity-axis.

6. The magnetic sensor module of claim 1, wherein the axially polarized back bias magnet is configured such that the first and the second in-plane magnetic field components change according to a rotation of a rotating member that has alternating first portions and second portions,
wherein the first and the second in-plane magnetic field components are stronger when proximate to one of the first portions and weaker when proximate to one of the second portions.

7. The magnetic sensor module of claim 6, wherein the rotating member is a toothed wheel, and the first portions are notches and the second portions are teeth of the toothed wheel.

8. The magnetic sensor module of claim 6, wherein the radially symmetric bias magnetic field is zero at the center axis of the axially polarized back bias magnet and increases in a radial direction in the sensor plane from the center axis.

9. The magnetic sensor module of claim 6, wherein the measurement values generated by the plurality of sensor elements oscillate between maximum and minimum values based on a speed of rotation of the rotating member.

10. The magnetic sensor module of claim 6, wherein the rotating member causes sinusoidal variations in the first and the second in-plane magnetic field components of the radially symmetric bias magnetic field as the rotating member rotates.

11. The magnetic sensor module of claim 1, wherein the axially polarized back bias magnet is an axially polarized cylinder magnet.

12. The magnetic sensor module of claim 1, wherein the magnetic sensor further comprises a sensor circuit configured to receive the measurement values from the plurality of sensor elements, and generate a measurement signal using a differential calculation configured to cancel out stray-fields in both a direction of the first sensitivity-axis and a direction of the second sensitivity-axis based on the received measurement values.

13. The magnetic sensor module of claim 12, wherein the sensor circuit is configured to cancel out the stray-fields in the direction of first sensitivity-axis using the differential calculation and the received measurement values of the first pair of sensor elements, and cancel out the stray-fields in the direction of second sensitivity-axis using the differential calculation and the received measurement values of the second pair of sensor elements.

14. The magnetic sensor module of claim 12, wherein the sensor circuit is configured to apply the differential calculation:

$$SE_{OUT}=SE_A-SE_B-(SE_C-SE_D),$$

wherein $SE_A$ and $SE_B$ correspond to the measurement values generated by first pair sensor elements, $SE_C$ and $SE_D$ correspond to the measurement values generated by the second pair of sensor elements, and $SE_{OUT}$ is the measurement signal.

15. The magnetic sensor module of claim 12, wherein the sensor circuit is configured to output the measurement signal to an external device.

16. The magnetic sensor module of claim 12, wherein the axially polarized back bias magnet is configured such that the first and the second in-plane magnetic field components change according to a rotation of a rotating member that has alternating first portions and second portions,
wherein the first and the second in-plane magnetic field components are stronger when proximate to one of the first portions and weaker when proximate to one of the second portions.

17. The magnetic sensor module of claim 16, wherein the rotating member is a toothed wheel, and the first portions are notches and the second portions are teeth of the toothed wheel.

18. The magnetic sensor module of claim 16, wherein the measurement values generated by the plurality of sensor elements oscillate between maximum and minimum values based on a speed of rotation of the rotating member.

19. The magnetic sensor module of claim 16, wherein the rotating member causes sinusoidal variations in the first and the second in-plane magnetic field components of the radially symmetric bias magnetic field as the rotating member rotates.

20. The magnetic sensor module of claim 16, wherein the measurement signal generated by the sensor circuit oscillates between maximum and minimum values based on a rotational speed of the rotating member.

21. The magnetic sensor module of claim 16, wherein a frequency of the measurement signal is proportional to a rotational speed of the rotating member.

22. The magnetic sensor module of claim 1, wherein the magnetic sensor module is twist-insensitive about the center axis of the axially polarized back bias magnet.

23. A method of measuring a rotational speed of a rotating member by a magnetic sensor, the magnetic sensor including a plurality of sensor elements arranged in a sensor plane of the magnetic sensor and are exposed to a substantially same working point of a radially symmetric bias magnetic field produced by an axially polarized back bias magnet, the method comprising:
generating measurement values by a plurality of sensor elements in response to sensing the radially symmetric bias magnetic field, wherein variations in the measurement values of the plurality of sensor elements are caused by a rotation of the rotating member;
generating a measurement signal using a differential calculation configured to, based on the measurement values, cancel out stray-fields in both a direction of a first sensitivity-axis of a first pair of sensor elements and a direction of a second sensitivity-axis of a second pair of sensor elements,
wherein the first pair of sensor elements are sensitive to a first in-plane magnetic field component of the radially symmetric bias magnetic field in the direction of the first sensitivity-axis,
wherein the second pair of sensor elements are sensitive to a second in-plane magnetic field component of the radially symmetric bias magnetic field in the direction of the second sensitivity-axis, and
wherein the measurement signal oscillates between maximum and minimum values based on a rotational speed of the rotating member; and
outputting the measurement signal.

24. A magnetic sensor module configured to detect a rotation of an object, comprising:
a magnetic sensor including a plurality of sensor elements arranged in a sensor plane of the magnetic sensor and are configured to generate measurement values in response to sensing a time varying magnetic field that varies relative to the rotation of the object;
wherein the plurality of sensor elements are arranged on a circumference of a circle at substantially equidistant angles, and
wherein the plurality of sensor elements are grouped into a plurality of pairs such that each pair has a sensitivity axis sensitive to one in-plane magnetic field component of a plurality of different in-plane magnetic field components of the time varying magnetic field; and a sensor circuit configured to receive the measurement values from the plurality of sensor elements, generate at least one measurement signal using a differential calculation configured to cancel out stray-fields in each direction of each of the plurality of different in-plane magnetic field components, and output the at least one measurement signal.

\* \* \* \* \*